United States Patent Office 3,377,275
Patented Apr. 9, 1968

3,377,275
TREATMENT FOR AQUEOUS INDUSTRIAL PROCESS FLUIDS
Raymond J. Michalski, Riverdale, Michael S. Sapienza, Oak Forest, and Leonard L. Wolfson, Park Forest, Ill., assignors to Nalco Chemical Company, Chicago, Ill., a corporation of Delaware
No Drawing. Filed June 17, 1965, Ser. No. 464,866
4 Claims. (Cl. 210—64)

ABSTRACT OF THE DISCLOSURE

This invention deals with synergistic blend of 3,5-dimethyl tetrahydro 1,3,5,2H-thiadiazine-2-thione in combination with formaldehyde as an improved microbiological formulation for treating industrial process fluids. Typical of the industrial process fluids are aqueous colloidal silica sols, paper mill systems, water flooding operations of the type used in the secondary recovery of petroleum and industrial lubricants and coolants.

---

This invention relates to novel biologically active compositions useful in controlling growth and reproduction of bacterial genera in a variety of aqueous industrial process fluids. It is particularly directed to compositions useful in controlling the growth of bacterial genera Pseudomonas, Aerobacter, and Flavobacterium and such, in aqueous industrial fluids as paper mill systems, aqueous colloidal silica sols, aqueous industrial lubricants, and aqueous fluids used as injection fluids in practicing the process known as secondary recovery.

Many aqueous industrial process fluids tend to become contaminated with microorganisms. When thus contaminated, these fluids are not completely satisfactory for their intended use. For example, in paper mills biological contamination causes growths to occur on process machinery thereby causing a decrease in operating efficiency in equipment. When these biological growths become enmeshed in the final stages of papermaking operation, sheet spoilage results. In the case of aqueous colloidal silica sols, biological contamination results in a finished product which has an undesirable lead gray color and a putrefactive odor.

In many metal forming operations, lubricants and cutting fluids are prepared by mixing organic compounds with water to produce solids or emulsions or suspensions. Due to the heat and dirt found in many metal working plants, bacteriological contamination of these fluids is inevitable. When biological contamination is too severe, they must oftentimes be discarded.

Other aqueous industrial process fluids which tend to be plagued by biological contamination are waters used as injection fluids in the secondary recovery of petroleum. For a more complete description of this process, see U.S. 2,738,325.

Many attempts have been made to correct biological problems by treating these systems with a variety of microbiological chemicals. While many chemical treatments of these systems have met with various degrees of success, their use is limited due to economic considerations. It would be a valuable contribution if it were possible to provide an effective, yet economical, treatment for industrial microbiological control in systems of the type described above.

Formaldehyde has been tried in a variety of the above systems as a microbiological chemical. Its effectiveness is oftentimes not realized until dosages in excess of several hundred parts per million are used. In some cases relatively large dosages are ineffective in achieving microbiological control in certain aqueous industrial process fluids. For these reasons formaldehyde has not received wide acceptance as an industrial microbiocide.

An effective industrial microbiocide is the well-known sulfur containing compound 3,5-dimethyl tetrahydro 1,3,5,2H-thiadiazine-2-thione, which will conveniently be called "organo sulfur." This material, while being effective at relative low dosages, is costly when compared to formaldehyde. If it were possible to combine low priced formaldehyde with organo sulfur and achieve superior results on a reduced cost dosage basis, a great benefit would be offered to the art.

As will be shown hereinafter, the invention is directed to the utilization of formaldehyde in combination with organo sulfur to provide low cost biologically active compositions useful for treating a variety of aqueous industrial process fluids. It is the formulation of such a blend of chemicals for use in treating aqueous industrial process fluids which becomes an important objective of this invention.

Another object of this invention is to provide a microbiologically active treatment for controlling such biological genera as Pseudomonas, Aerobacter, and Flavobacterium bacteria in such aqueous systems as paper mill systems, aqueous colloidal silica sols, cutting and rolling oils and waters used in the secondary recovery of petroleum. Other objects will appear hereinafter.

In accordance with the invention it has been found that a variety of aqueous industrial process fluids may be treated to prevent the growth and reproduction of microorganisms with a microbiological composition comprising organo sulfur and formaldehyde combined in a weight ratio of from 5:10 to 5:1. The amount required to achieve microbiological control will be as little as 5 p.p.m. with dosages as high as 100–500 p.p.m. being required under special conditions.

The compositions of the invention are useful in treating aqueous emulsions of cutting and rolling oils. These emulsions frequently contain from 1 to 40% by weight of lubricant and other organic materials. The active lubricants often contain various fatty ingredients such as chemically modified animal fats, vegetable oils, and petroleum derived paraffinic type materials. Such compounds contain a large preponderance of the elements carbon and hydrogen. When treating systems of this type, the organo sulfur and formaldehyde are preferably combined in a weight ratio of from 5:1 to 1:10.

The compositions of the invention are preferably combined in a weight ratio of 1:4 to 4:1 of organo sulfur to formaldehyde when used to treat aqueous colloidal silica sols. Typical aqueous colloidal silica sols which are sold commercially under the trade name Nalcoag have typical specifications as set forth, following in Table I.

TABLE I

| Silica Sol | I | II | III | IV | V |
|---|---|---|---|---|---|
| Percent colloidal silica as $SiO_2$ | 15 | 30 | 35–36 | 21–22 | 49–50 |
| pH | 8.6 | 10.2 | 8.6 | 3.7 | 9.0 |
| Viscosity at 77° F., cps | <5 | <5 | <5 | <10 | 20–30 |
| Specific gravity at 68° F | 1.09 | 1.205 | 1.255 | 1.06 | 1.385 |
| Average surface area m.² per gram of $SiO_2$ | 330–430 | 190–270 | 135–190 | 135–190 | 120–150 |
| Average particle size, millimicrons | 7.9 | 11–16 | 16–22 | 16–22 | 20–25 |
| Density, #/gallon at 68° F | 9.1 | 10.0 | 10.5 | 8.8 | 11.6 |
| Freezing point, ° F | 32 | 32 | 32 | −10 | 32 |
| $Na_2O$, percent | 0.04 | 0.40 | 0.10 | 0.05 | 0.30 |

The colloidal silica sols susceptible to being treated by the compositions of the invention are relatively free of alkali metal oxides and have large specific surface areas. As a general rule, the $SiO_2$ to $Na_2O$ ratio will vary from as little as 10:1 to 500:1. In some instances, where the silica sols have been deionized, it is possible for these colloidal silica materials to be completely free from metal ions. Similarly the surface areas while capable of variations between 25 sq. meters per gram to about 1000 sq. meters per gram, usually have surface areas within the range of about 25 sq. meters per gram to 400 sq. meters per gram. They may contain as much as 70% $SiO_2$ by weight.

When used to treat paper mill systems, the compositions of the invention are preferably combined in a weight ratio of from 1:4 to 4:1 of organo sulfur to formaldehyde. They may be applied at dosages ranging from as little as 5 p.p.m. to as much as 200–500 p.p.m. depending upon the particular problem encountered in a paper mill system.

The organo sulfur may be combined with wetting agents, dispersants and other chemicals to improve their compatibility with the various systems in which they are used. Illustrative of such formulations are the following:

Composition No. I

| | Percent |
|---|---|
| Soft water | 53.0 |
| Ethylenediamine tetraacetic acid | 1.0 |
| 50% sodium hydroxide | 18.0 |
| Organo sulfur | 18.0 |
| Isopropanol | 8.0 |
| Gluconic acid | 2.0 |
| | 100.0 |

Composition No. II

| | Percent |
|---|---|
| Organo sulfur | 25.0 |
| Sodium hydroxide | 25.0 |
| Distilled water | 34.0 |
| Gluconic acid | 2.0 |
| Ethylenediamine tetraacetic acid | .5 |
| 2-mercaptobenzothiazole | 5.0 |
| Isopropanol, 99% | 8.5 |
| | 100.0 |

Composition No. III

| | Percent |
|---|---|
| Dextrine | 5.0 |
| Formaldehyde | 25.0 |
| Sodium chloride | 25.0 |
| Sodium carbonate | 25.0 |
| Organo sulfur | 20.0 |
| | 100.0 |

While the microbiocides may be combined into a simple formulation, it will be understood that, they also may be added separately to the various systems described. Also, they may be added with other bacteriological agents which sometimes allow better control in specific systems under special condition.

To demonstrate the effectiveness of the compositions in controlling and inhibiting the growth of microorganism in aqueous colloidal silica sols of the type shown in Table I, a static test method was used.

This test comprised inoculating a five gallon sample of the particular silica sol with a previously contaminated sample of silica sol and the treatment to be investigated and then allowing the inoculated material to age for 90 days at an average temperature of 98° F. After the storage period, routine counts were run to determine the effectiveness of the particular treatment employed.

A microbial analysis of a typical contaminated aqueous silica sol is shown in Table II.

TABLE II

| Species: | Organisms per ml. |
|---|---|
| Aerobacter | $1 \times 10^4$ |
| Pseudomonas | $1 \times 10^5 – 1 \times 10^6$ |
| Total count | $2 \times 10^6 – 1 \times 10^7$ |
| Molds (Penicillium) | $1 \times 10^3$ |

Using the above test method, a series of tests were run to demonstrate the effectiveness of organo sulfur in combination with formaldehyde. The results of these tests are presented in Table III. The formaldehyde used was in the form of a 40% aqueous solution. The silica sol studied corresponded to silica sol No. II, Table I.

TABLE III

| Composition | Dosage, p.p.m. | Count |
|---|---|---|
| Composition I | 200 | $1 \times 10^6$ |
| Formaldehyde | 50 | $1 \times 10^6$ |
| Formaldehyde | 50 | $>10$ |
| Composition I | 50 | |

To test the effectiveness of the composition in preventing the growth in aqueous emulsions of rolling oils and cutting fluids, the following test method was used. A test water was prepared which contained 50% by weight of Chicago tap water and 50% by weight deionized water. To this was added 0.5% of an inorganic phosphate stabilizer made up from two parts of disodium pryophosphate and one part of tetrasodium pyrophosphate. To this test water, 14% by weight of the rolling oil to be studied is added.

The oil-water mixture is then beeclerized for one minute to form an emulsion. To the emulsified sample an inoculum is added which is obtained from a previously contaminated sample of a similar emulsion. Sixty ml. samples are then placed in 2 oz. sterile bottles to which is then added the treatment to be evaluated. The treated 2 oz. samples are then incubated at 98° F. for one month. At the end of this time total counts are taken to determine the number of organisms killed by the treatment.

A typical analysis of a contaminated rolling oil emulsion is presented in Table IV.

TABLE IV

| Bacteria— | |
|---|---|
| Species: | Organisms per ml. |
| Sulfate reducers | $3 \times 10^3$ |
| Pseudomonas | $6 \times 10^6$ |
| Arobacter | $2 \times 10^5$ |
| Total count | $5.7 \times 10^7$ |
| Yeast: | |
| Torula | $5 \times 10^5$ |
| Saccharomyes | $5 \times 10^5$ |

Using the above test method, a typical rolling oil was treated with various organo sulfur formaldehyde treatments both alone and in combination. The results of these tests are presented below in Table V.

TABLE V

| Composition I | | Formalin [1] | | Composition I/ Formalin | | No Treatment |
|---|---|---|---|---|---|---|
| P.p.m. | Org./ml.[2] | P.p.m. | Org./ml. | P.p.m. | Org./ml. | |
| 100 | $4 \times 10^6$ | 100 | $1 \times 10^5$ | 100/50 | $<100$ | $4 \times 10^9$ |
| 150 | $1.1 \times 10^6$ | 150 | $1 \times 10^5$ | 100/150 | $<100$ | |
| 200 | $<100$ | 200 | $1 \times 10^4$ | 100/250 | $<100$ | |
| | | 250 | $<100$ | | | |

[1] 40% by weight formaldehyde.
[2] Organisms per milliliter.

To determine the efficacy of the compositions in paper mill systems, the test method described in the article published in TAPPI Journal, February 1963, titled "A Method for Determining the Effect of Dispersants in Slime Control Performance," by R. J. Michalski, L. L. Wolfson and J. R. Nelson was used.

Plate counts of the recirculating water in the control unit containing no toxicant were made on tryptone glucose extract-agar 30 min. after culture addition to determine the initial titer. Subsequent plate counts of all test waters were made at 24, 48, and 72 hours. Plates were allowed to incubate for 48 to 72 hours at 98° F. prior to reading. In evaluating the platings for bacterial growth, particular emphasis was made to consider the types of test bacteria perisisting in all units, in addition to bacterial numbers.

Using the above test method, Table VI is presented to show the merits of the invention.

TABLE VI

| Treatment | Dosage, p.p.m. | Counts 24 hr. | Counts 48 hr. | Counts 72 hr. |
|---|---|---|---|---|
| Control | | $3 \times 10^7$ | $7 \times 10^7$ | $7 \times 10^7$ |
| Paraformaldehyde | 100 | $4 \times 10^6$ | $3 \times 10^7$ | $4 \times 10^7$ |
| Composition I | 300 | $2 \times 10^6$ | $9 \times 10^6$ | $3 \times 10^7$ |
| Composition I | 200 | $2 \times 10^4$ | $9 \times 10^6$ | $2 \times 10^7$ |
| Formaldehyde * | 50 | | | |
| Composition I | 200 | $<1,000$ | $9 \times 10^4$ | $3 \times 10^7$ |
| Formaldehyde | 100 | | | |
| Formaldehyde | 200 | $4 \times 10^7$ | $4 \times 10^7$ | $5 \times 10^7$ |

*40% HCHO.

To compare the various ratios of organo sulfur to formaldehyde where maximum activity is achieved the following test method was employed.

TEST METHOD C

Organisms *Aerobacter aerogenes* and *Aspergillus niger* were selected for culture since they are typical of microorganisms found in mill water systems and other industrial process waters. The culture medium used consisted of 24 grams of dextrose, 1 gram of Basaminbact (Anheuser Busch), added to one liter of Chicago tap water and sterilized by autoclaving under 15 pounds of pressure for 15 minutes. Appropriate amounts of 18 to 24 hour nutrient broth culture of *A. aerogenes* and *A. niger* were respectively mixed with 200 ml. of the culture medium to form a primary culture immediately before starting tests. The amount of nutrient broth culture used was such as to give one million organisms per ml. of medium. 20 ml. of the inoculated culture medium were placed in each of a series of fermentation tubes with caps which contained the appropriate concentration of stock chemical to avoid more than a 5% error in final dilution. For this purpose, the volume of chemical introduced should be 1 ml. or less. The chemical and the inoculated medium were mixed gently. A control test was also run in which the chemical was omitted. In mixing, each tube was inverted in such a manner as to fill the upright closed end of the tube with the test liquid. The tubes were incubated at 30° C. for 48 hours. At the end of one hour in contact with treating agent, and again after 24 hours' contact a loopful of the test mixture was withdrawn from each tube and inoculated in a subculture tube containing 10 ml. of sterile nutrient broth. The subculture tubes were incubated at 37° C. for 48 hours and examined for growth. The results of these tests indicated 1 and 24 hour killing ranges. The gas production in the primary culture for inhibition level was recorded at 48 hours for *A. aerogenes*. Growth inhibition in the primary culture was recorded for *A. niger* after five days.

If the chemical has bacteriostatic or fungistatic action at the concentration tested there will be no growth or gas production in some of the tubes. At some point in the series of dilutions growth or gas will appear and these will be present in all lower concentrations. The inhibiting range is defined by two numbers, the lesser one that at which gas or growth appears, the higher one that at which these are absent. For example, if growth or gas occurs at 10 p.p.m. of bactericide concentration, but no growth or gas at 15 p.p.m., the inhibiting range is expressed as 10–15 p.p.m. indicating that the concentration of chemical necessary to inhibit growth lies somewhere between these values.

The 1 hour killing range and the 24 hour killing range are determined in a similar manner by observing the subculture tubes for the presence or absence of growth after the appropriate period of incubation.

Using the above method the following results were obtained which are presented in Table VII below.

TABLE VII

| Treatment | Dosage, p.p.m. | Total Count Organisms per ml. |
|---|---|---|
| Control | | $3 \times 10^6$ |
| Formaldehyde (40% solution) | 25 | $3 \times 10^6$ |
| | 50 | $2 \times 10^3$ |
| | 60 | $1 \times 10^3$ |
| | 70 | $3 \times 10^3$ |
| | 80 | $6 \times 10^3$ |
| | 90 | $<100$ |
| | 100 | $<100$ |
| Composition I | 50 | $3 \times 10^6$ |
| | 100 | $3 \times 10^6$ |
| | 200 | $3 \times 10^6$ |
| | 300 | $4 \times 10^4$ |
| Composition I | 25 | $2 \times 10^5$ |
| Formaldehyde | 30 | |
| Composition I | 25 | $<100$ |
| Formaldehyde | 40 | |
| Composition I | 40 | $3 \times 10^6$ |
| Formaldehyde | 5 | |
| Composition I | 40 | $3 \times 10^6$ |
| Formaldehyde | 10 | |
| Composition I | 40 | $<100$ |
| Formaldehyde | 50 | |
| Composition I | 50 | $<100$ |
| Formaldehyde | 40 | |

The test results shown the striking effects achieved when the organo sulfur and formaldehyde are combined in certain weight ratios to treat specific industrial process fluids. The compositions are effective, and inexpensive.

We claim:

1. A method for controlling the growth and reproduction of the bacterial genera Pseudomonas, Aerobacter and Flavorbacteria which are undesirable contaminants in aqueous industrial process fluids, which comprises treating said process fluids with from 5 to 100 p.p.m. of a composition, which comprises a mixture of 3,5-dimethyl tetrahydro 1,3,5,2H-thiadiazine-2-thione and formaldehyde, combined in a weight ratio of from 5:10 to 5:1.

2. A method for controlling the growth and reproduction of the bacterial genera Pseudomonas, Aerobacter, and Flavobacteria which are undesirable contaminants in an aqueous industrial lubricant which contains from 1 to 40% by weight of an organic lubricating compound which contains in its molecular configuration a large preponderance of the elements carbon and hydrogen, which comprises treating said industrial lubricants with from 5 to 100 p.p.m. of a composition comprising a mixture of 3,5-dimethyl tetrahydro 1,3,5,2H-thiadiazine-2-thione and formaldehyde combined in a weight ration of from 5:1 to 1:10.

3. A method for controlling the growth and reproduction of the bacterial genera Pseudomonas, Aerobecter, and Flavobacteria which are undesirable contaminants in aqueous colloidal silica sols, which comprises treating said silica sols with from 5 to 100 p.p.m. of a composition which comprises a mixture of 3,5-dimethyl tetrahydro 1,3,5,2H-thiadiazine-2-thione and formaldehyde combined in a weight ratio of from 1:4 to 4:1.

4. A method for controlling the growth and reproduction of the bacterial genera Pseudomonas, Aerobacter and Flavobacteria which are undesirable contaminants in paper mill systems, which comprises treating said paper mill systems with from 5 to 100 p.p.m. of a composition which comprises a mixture of 3,5-dimethyl tetrahydro 1,3,5,2H-thiadiazine-2-thione and formaldehyde combined in a weight ratio of from 1:2 to 2:1.

References Cited

UNITED STATES PATENTS

| | | | |
|---|---|---|---|
| 2,838,389 | 6/1958 | Yoder | 167—33 |
| 3,067,095 | 12/1962 | Baltazzi | 167—33 |
| 3,257,320 | 6/1966 | Hodge | 167—33 |
| 3,299,056 | 1/1967 | Cummins | 260—243 |

MICHAEL E. ROGERS, *Primary Examiner.*

UNITED STATES PATENT OFFICE

CERTIFICATE OF CORRECTION

Patent No. 3,377,275                                         April 9, 1968

Raymond J. Michalski et al.

It is certified that error appears in the above identified patent and that said Letters Patent are hereby corrected as shown below:

Column 2, TABLE I, second column, line 6 thereof, "7.9" should read -- 7-9 --. Column 4, TABLE III, third column, line 3 thereof, ">10" should read -- <10 --.

Signed and sealed this 16th day of December 1969.

(SEAL)
Attest:

Edward M. Fletcher, Jr.                          WILLIAM E. SCHUYLER, JR.
Attesting Officer                                          Commissioner of Patents